US012384142B2

(12) United States Patent
Hoffman, Jr.

(10) Patent No.: US 12,384,142 B2
(45) **Date of Patent: *Aug. 12, 2025**

(54) REMOVABLE SCREEN PRINTING PALLET SYSTEM FOR MAINTAINING PROPER REGISTRATION IN PRINT MACHINES

(71) Applicant: M&R Printing Equipment, Inc., Roselle, IL (US)

(72) Inventor: Richard C. Hoffman, Jr., Lake Forest, IL (US)

(73) Assignee: M&R Printing Equipment, Inc., Roselle, IL (US)

( * ) Notice: Subject to any disclaimer, the term of this patent is extended or adjusted under 35 U.S.C. 154(b) by 160 days.

This patent is subject to a terminal disclaimer.

(21) Appl. No.: 18/088,900

(22) Filed: Dec. 27, 2022

(65) Prior Publication Data

US 2023/0241880 A1 Aug. 3, 2023

Related U.S. Application Data

(63) Continuation of application No. 17/132,571, filed on Dec. 23, 2020, now Pat. No. 11,565,515, which is a (Continued)

(51) Int. Cl.

| | |
|---|---|
| ***B41F 15/08*** | (2006.01) |
| ***B41F 15/18*** | (2006.01) |
| ***B41F 15/26*** | (2006.01) |
| ***B41F 15/34*** | (2006.01) |
| ***B41M 1/12*** | (2006.01) |
| *B41M 1/26* | (2006.01) |

(52) U.S. Cl.

CPC .............. *B41F 15/34* (2013.01); *B41F 15/18* (2013.01); *B41F 15/26* (2013.01); *B41M 1/12* (2013.01); *B41M 1/26* (2013.01)

(58) Field of Classification Search

CPC .......... B41F 15/08; B41F 15/10; B41F 15/14; B41F 15/18; B41F 15/22; B41F 15/26; B41F 15/0863; B41F 17/38; B41F 17/003; B41F 17/005; B41M 1/12; B41M 1/26; B41P 2200/40; B41P 2215/11; B41P 2215/112; B41P 2215/114; B41P 2217/60

USPC ................................ 101/114, 115, 126, 474

See application file for complete search history.

(56) References Cited

U.S. PATENT DOCUMENTS 2,221,197 A 11/1940 Martin
3,643,519 A 2/1972 Ebersold
(Continued)

FOREIGN PATENT DOCUMENTS

EP 3332978 A1 * 6/2018 ............. B41J 11/02

*Primary Examiner* — Leslie J Evanisko
(74) *Attorney, Agent, or Firm* — UB Greensfelder LLP; Richard C. Himelhoch

(57) ABSTRACT

A removable pallet system for maintaining proper registration on a first printing machine and on a second printing machine is provided. The system includes a removable pallet having a planar garment supporting upper surface, an upper assembly for supporting the removable pallet and a lower assembly for connecting the upper assembly, lower assembly and pallet to an arm of the first printing machine or the second printing machine. The system further includes an adjustment mechanism. The adjustment mechanism can include a first X-coordinate adjuster and a first Y-coordinate adjuster for moving the upper assembly relative to the lower assembly.

18 Claims, 12 Drawing Sheets

Related U.S. Application Data continuation of application No. 16/102,291, filed on Aug. 13, 2018, now Pat. No. 10,875,291, which is a continuation of application No. 15/131,741, filed on Apr. 18, 2016, now Pat. No. 10,046,553, which is a continuation of application No. 14/060,251, filed on Oct. 22, 2013, now Pat. No. 9,315,063.

(56) References Cited

U.S. PATENT DOCUMENTS

| | | | | |
|---|---|---|---|---|
| 4,735,139 | A | 4/1988 | Szarka | |
| 4,819,559 | A | 4/1989 | Szarka | |
| 4,846,058 | A | 7/1989 | Farris | |
| 4,875,268 | A | 10/1989 | Szarka | |
| 4,909,146 | A | 3/1990 | Szarka | |
| 4,984,960 | A | 1/1991 | Szarka | |
| 5,090,313 | A | 2/1992 | Chapman | |
| 5,149,045 | A | 9/1992 | Szarka | |
| 5,226,362 | A | 7/1993 | Iaccino | |
| 5,247,885 | A | 9/1993 | Iaccino | |
| 5,575,206 | A | 11/1996 | Szyszko | |
| 5,588,770 | A | 12/1996 | Bart | |
| 5,816,173 | A | 10/1998 | Warneford | |
| 5,921,176 | A | 7/1999 | Oleson | |
| 5,937,749 | A | 8/1999 | Ford | |
| 5,943,953 | A | 8/1999 | Oleson | |
| 5,953,987 | A | 9/1999 | Oleson | |
| 5,974,962 | A | 11/1999 | Hamu et al. | |
| 6,202,552 | B1 * | 3/2001 | Billington, III | B41F 15/0863 101/115 |
| D480,753 | S | 10/2003 | Oleson | |
| 6,640,714 | B1 | 11/2003 | Papa | |
| 6,651,554 | B1 | 11/2003 | Williams | |
| 6,910,419 | B2 | 6/2005 | Oleson | |
| 7,413,301 | B2 | 8/2008 | Niimi | |
| 9,315,012 | B2 | 4/2016 | Hoffman, Jr. | |
| 9,315,063 | B2 | 4/2016 | Hoffman, Jr. | |
| 9,744,758 | B2 | 8/2017 | Hoffman, Jr. | |
| 10,046,553 | B2 | 8/2018 | Hoffman, Jr. | |
| 10,875,291 | B2 | 12/2020 | Hoffman, Jr. | |
| 11,565,515 | B2 | 1/2023 | Hoffman, Jr. | |
| 2004/0000240 | A1 | 1/2004 | Oleson | |
| 2015/0107468 | A1 | 4/2015 | Hoffman, Jr. | |
| 2017/0015095 | A1 | 1/2017 | Hoffman, Jr. | |
| 2017/0015096 | A1 | 1/2017 | Hoffman, Jr. | |
| 2018/0345652 | A1 | 12/2018 | Hoffman, Jr. | |
| 2021/0178749 | A1 | 6/2021 | Hoffman, Jr. | |

* cited by examiner

REMOVABLE SCREEN PRINTING PALLET SYSTEM FOR MAINTAINING PROPER REGISTRATION IN PRINT MACHINES

CROSS-REFERENCE TO RELATED APPLICATIONS

The present application is a continuation of U.S. application Ser. No. 17/132,571, filed Dec. 23, 2020, which is a continuation of U.S. application Ser. No. 16/102,291, filed Aug. 13, 2018, now U.S. Pat. No. 10,875,291, which is a continuation of U.S. application Ser. No. 15/131,741, filed Apr. 18, 2016, now U.S. Pat. No. 10,046,553, which is a continuation of and claims priority from U.S. application Ser. No. 14/060,251, filed Oct. 22, 2013, now U.S. Pat. No. 9,315,063, the contents of which are incorporated herein by reference.

FEDERALLY SPONSORED RESEARCH OR DEVELOPMENT

Not applicable.

TECHNICAL FIELD

The invention relates to screen printing and more particularly to a pallet assembly and a method for using the pallet assembly in a screen printing operation.

BACKGROUND

Printed indicia which are applied to textiles such as T-shirts and other articles of clothing have become very popular in the last decade. Boutiques which specialize in printing fanciful indicia such as ornamentation, slogans, college names, or sports team names on T-shirts and other clothing are commonly seen in shopping malls. The indicia available at these boutiques can be pre-printed on a substrate and applied to articles of clothing purchased by the consumer with a heated press by boutique operators, or can be applied directly to an article of clothing. The indicia can comprise either simple one-color block letters or elaborate multi-color illustrations.

In common use in the industry in printing objects such as substrates or articles of clothing is a multi-station, turret type, printing press. The printing press of this type has a plurality of flat beds or platens spaced along its perimeter. Corresponding to each of these beds is a series of stations where a part of the indicia is alternately printed and cured on the object, i.e., substrate or article, being printed. The number of stations employed depends on the number of colors to be printed on the object. Indicia can consist of up to ten colors or more.

Also, in common use are single station printing machines. Single station machines require the operator to print one color at a time using one screen at a time. After one color is printed on an object, the screen is removed and another screen placed thereon to print another color. As with the multi-station press, the new screen must be perfectly aligned with the preceding screen such that the image remains in registration. This single-stage process is very time-consuming, especially if multiple colors are used.

The most critical and time-consuming part of the screen printing process involving multiple colors is the alignment or registration of successive screens. Each screen for each color must be in registration with the other screens to ensure that the various colors do not overlap or are incorrectly spaced. Otherwise, the printed indicia will not be in registration, resulting in a skewed or imperfect indicia.

Current screen printing apparatuses, such as turret-type screen printing apparatuses, are generally limited in the number of colors that can be applied to a given textile by the number of printing heads or stations positioned about the screen printing apparatus. This makes it difficult or impossible to print a textile with, for example, 15 colors on a single 12 station printing apparatus.

However, many screen printing shops have more than one printing machine. If a garment could be transferred from a first machine to a second machine, the number of colors that could be printed on a textile could be expanded beyond the number of print stations available on a single printing machine. Unfortunately, to do so would require maintaining perfect or near-perfect registration between the textile and the print heads on two separate printing machines. Currently, no adequate solution to this problem has been developed which would allow transferring an already printed textile from one screen printing machine to a second screen printing machine while maintaining adequate registration of the textile to the print heads on the two separate machines.

The present invention is provided to solve the problems discussed above and other problems, and to provide advantages and aspects not provided by prior automated printing machines and methods of screen printing of this type. A full discussion of the features and advantages of the present invention is deferred to the following detailed description, which proceeds with reference to the accompanying drawings.

SUMMARY OF THE INVENTION

One aspect of the invention is directed to a method of screen printing comprising the step of positionally synchronizing a plurality of pallet assemblies on a first screen printing machine with a plurality of pallet assemblies on a second screen printing machine wherein a screen printed garment having a properly aligned first image received from the first screen printing machine can be transferred on a portion of one of the pallet assemblies on the first screen printing machine to one of the plurality of pallet assemblies on the second printing machine and wherein the properly aligned first image on the garment is in proper positional alignment with a screen printing head on the second screen printing machine such that a second image complimentary to the first image may be printed on the garment in proper position on the garment relative to the first image without further user intervention to positionally locate the first image relative to the screen printing head 31 on the second machine.

Another aspect of the present invention is directed to a method of screen printing comprising the steps of: (1) establishing a first screen printing machine having a frame, a plurality of printing heads attached to the frame and a plurality of pallet assemblies attached to the frame and separately and alternatingly alignable with each of the plurality of printing heads 31 wherein each of the pallet assemblies comprises a subassembly attached to the frame and locationally adjustable relative thereto; (2) establishing a second screen printing machine also having a frame, a plurality of printing heads attached to the frame and a plurality of pallet assemblies attached to the frame and separately and alternatingly alignable with each of the plurality of printing heads wherein each of the pallet assemblies comprises a subassembly attached to the frame and locationally adjustable relative thereto; (3) establishing a first alignment means 84 supported by the first screen printing machine; (4) providing a pallet removably transferable between the subassemblies and positionally registered relative thereto; (5) adjusting a position of the pallet as it is transferred to each pallet assembly on the first screen printing machine relative to the first alignment means 84; (6) transferring the first alignment means to the second screen printing machine and supporting the first alignment means by the second screen printing machine; (7) adjusting a position of the pallet as it is transferred to each pallet assembly on the first screen printing machine relative to the first alignment means; (8) registering a position of each of the printing heads 31 on the first screen printing machine relative to a first pallet assembly on the first screen printing machine; and (9) registering a position of each of the printing heads on the second screen printing machine relative to a second pallet assembly on the second screen printing machine.

Another aspect of the present invention is directed to a pallet assembly comprising a removable pallet and a subassembly attachable to an arm of a screen printing apparatus. The subassembly comprises an upper subassembly and a lower subassembly. The upper subassembly has a first registration system for maintaining the pallet on the upper subassembly in proper registration. The lower subassembly is attached to the upper subassembly and is configured for relative movement therewith. The lower subassembly has a second registration system. The second registration system provides relative X and Y coordinate movement between the upper subassembly and the lower subassembly. A pair of first-coordinate adjusters allow actuation of a first relative movement between the upper subassembly and the lower subassembly. A second-coordinate adjuster actuation of a second relative movement between the lower subassembly and the upper subassembly transverse to the first relative movement.

Another aspect of the present invention is directed to a method of screen printing comprising the steps of: (1) establishing a first screen printing machine having a frame, a plurality of printing heads attached to the frame and a plurality of pallet assemblies attached to the frame and separately and alternatingly alignable with each of the plurality of printing heads wherein each of the pallet assemblies comprises a subassembly attached to the frame and locationally adjustable relative thereto; (2) establishing a second screen printing machine also having a frame, a plurality of printing heads attached to the frame and a plurality of pallet assemblies attached to the frame and separately and alternatingly alignable with each of the plurality of printing heads wherein each of the pallet assemblies comprises a subassembly attached to the frame and locationally adjustable relative thereto; (3) establishing a first alignment means supported by the first screen printing machine; (4) providing a pallet removably transferable between the subassemblies and positionally registered relative thereto; (5) adjusting a position of the pallet as it is transferred to each pallet assembly on the first screen printing machine relative to the first alignment means; (6) transferring the first alignment means to the second screen printing machine and supporting the first alignment means by the second screen printing machine; and (7) adjusting a position of the pallet as it is transferred to each pallet assembly on the first screen printing machine relative to the first alignment means.

Another aspect of the present invention is directed to a method of screen printing comprising the steps of: 1) attaching a first plurality of like pallet assemblies to a corresponding number of support arms on a first screen printing apparatus wherein each pallet assembly comprises a lower subassembly attached to one of the support arms and an upper subassembly for supporting a pallet thereon having a pallet registry system; 2) attaching a second plurality of like pallet assemblies to a corresponding number of support arms on a second screen printing apparatus wherein each of the second plurality of like pallet assemblies is substantially identical to the first plurality of like pallet assemblies; 3) establishing a first alignment mechanism between the first screen printing apparatus and the first plurality of like pallet assemblies wherein the alignment mechanism comprises a removable pallet having a first target thereon which separately engages the pallet registry system when supported by a corresponding upper subassembly and a second target attached to a first print station on the first screen printing apparatus; 4) supporting the removable pallet on a first pallet assembly of the first plurality of like subassemblies; 5) bringing the first pallet assembly of the first plurality of like subassemblies to the first print station on the first screen printing machine; 6) aligning the first target with the second target by providing relative movement between the upper subassembly and the lower subassembly of the first pallet assembly of the first plurality of like subassemblies; 7) fixing the relative position of the upper subassembly to the lower subassembly of the first pallet assembly of the first plurality of like subassemblies; 8) repeating steps 4) through 7) for each remaining pallet assembly in the first plurality of like pallet assemblies; 9) establishing the alignment mechanism on the second screen printing apparatus; 10) performing steps 4) through 7) for each pallet assembly in the second plurality of like pallet assemblies.

Another aspect of the present invention is directed to a pallet assembly comprising a removable pallet and a subassembly. The subassembly is attachable to an arm of a screen printing apparatus. The subassembly comprises an upper subassembly and a lower subassembly. The upper subassembly has a first registration system for maintaining the pallet on the upper subassembly in proper registration. The lower subassembly is attached to the upper subassembly and is configured for relative movement therewith. A second registration system provides relative X and Y coordinate macro movement between the upper subassembly and the lower subassembly. A third registration system separate from the second registration system provides relative X and Y coordinate micro movement between the upper subassembly and the lower subassembly.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

Figure 1:
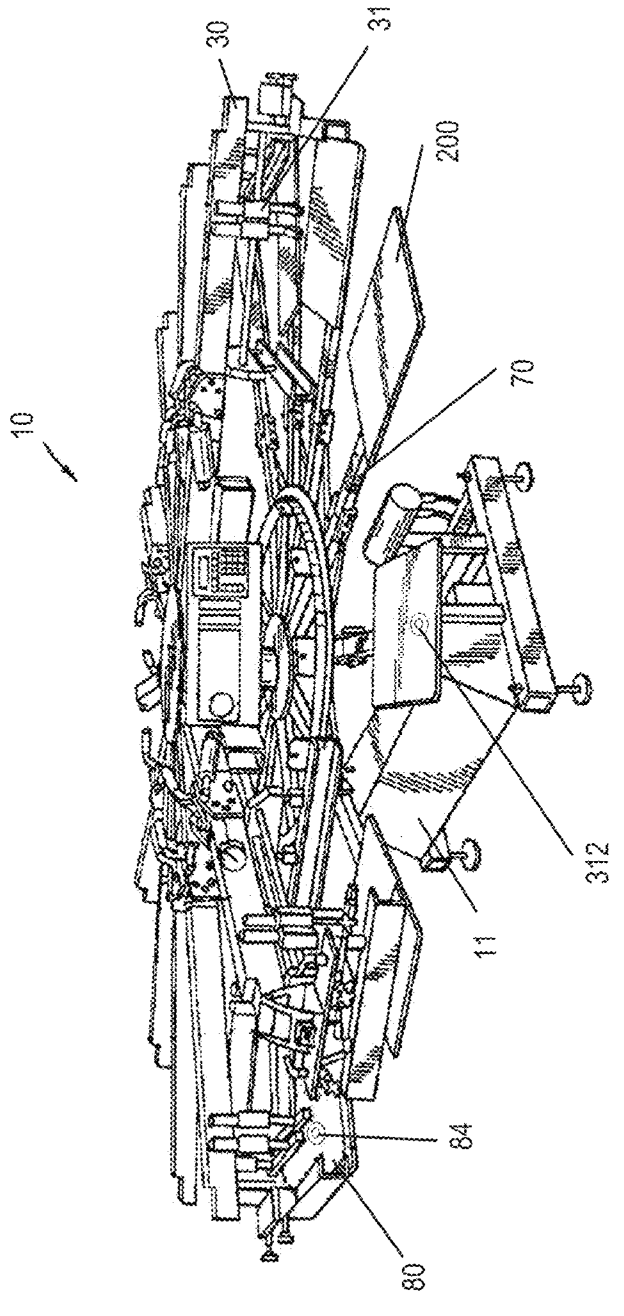
FIG. 1 is a generally schematically represented perspective view of a turret screen printing apparatus which may be used in conjunction with or in carrying out the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a typical turret style automated multi-stroke printing press 10 is shown, including a frame including a central turret or base section 11 supporting a plurality of spaced apart, spoking, radial upper arms 30 and radial lower arms 70. In the embodiment shown, the distal ends of the lower arms 70 support pallet assemblies for carrying a target article, e.g., a textile, a rug, or other substrate (not shown), to be printed upon. The distal ends of the upper arms 30 support printing heads 31 or conventional, well-known curing units (not shown), such that a curing station or printing head 31 is associated with each arm 30. While the machine of the present invention is shown and described having upper arms supporting printing heads or curing units and the lower arms supporting pallets, it is, of course possible for the upper arms to support the pallets and the lower arms to support the printing heads or curing units.

One of the sets of arms 30,70 rotates around the base section 11. In the embodiment shown, the lower arms 70 rotate relative to the upper arms 30. This base section 11 includes, among other things, the unit's 10 supporting feet and control panel.

The typical printing head includes a flood bar, a squeegee, and a screen supported by opposed arms. Relative movement between the flood bar and a target area, which may include the screen, a target article, and the pallet, causes the flood bar to bring paint or ink to the screen. Upon a relative movement by the squeegee and the target area, the ink is applied across the screen by the adjacent squeegee. Together, a print is formed on the textile. Typically, only one color can be delivered to a garment by each print head 31.

This process and the apparatus are well-known in the art of screen printing. However, many times a user or operator will want to produce a print on a target using a number of colors that exceeds the capability of a single screen printing machine. In such case, the user may be inclined to use a second screen printing machine 100 to deliver the additional colors using the print heads 31 on the second machine 100. Unfortunately, up to this point, maintaining proper registration between the garment and the print heads from the first machine 10 to the second machine 100 has been difficult if not impossible. Existing screen printing machines simply do not provide the means necessary to ensure registration between the garment and the print heads from screen printing machine to screen printing machine. The present invention provides the means necessary to carry out such a task.

As discussed herein the first and second screen printing machines 10,100 are substantially identical.

Figure 2:
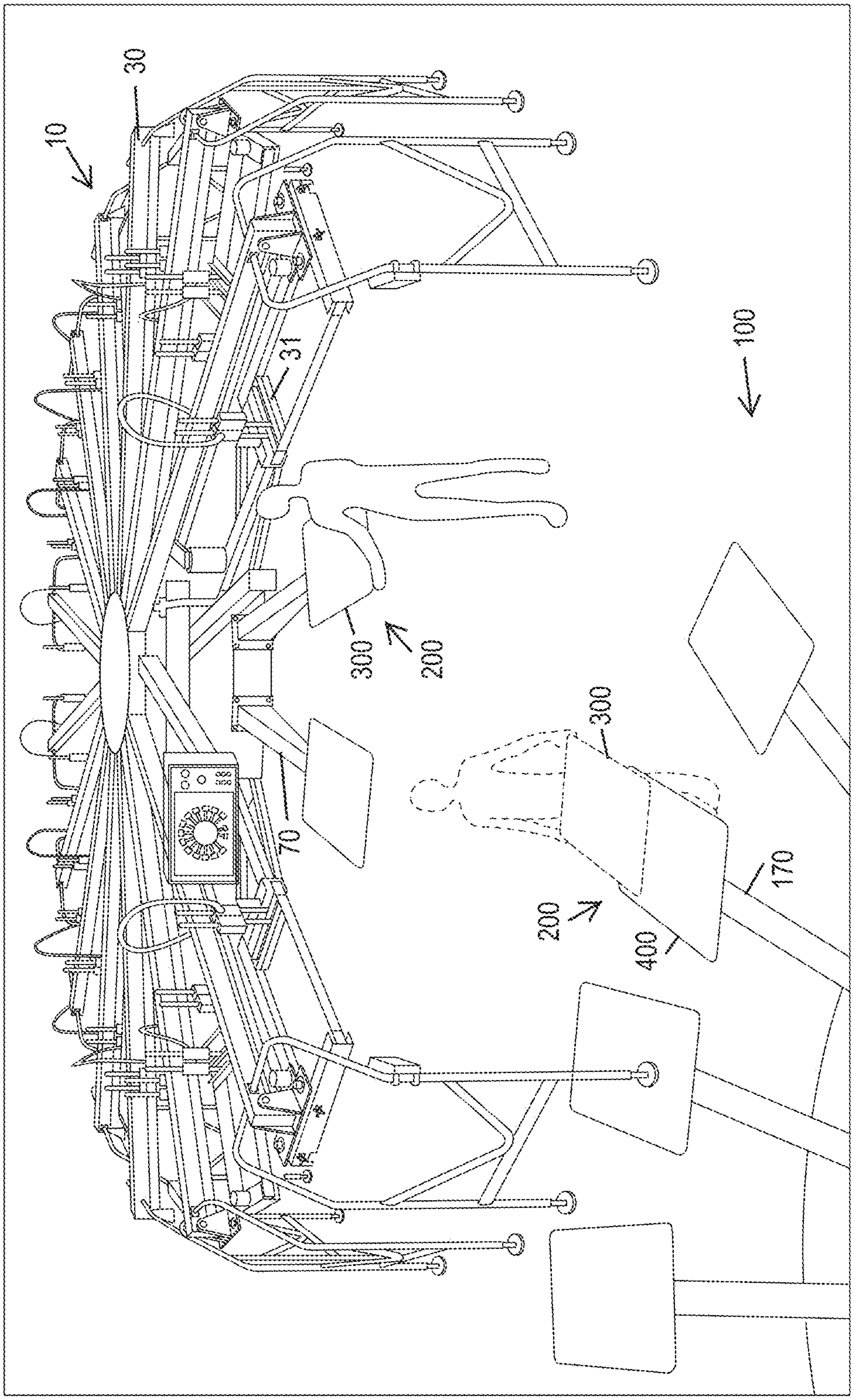
FIG. 2 is a generally schematic representation of a first screen printing and a second screen printing apparatus wherein a user or operator transfers a pallet carrying a garment or object to be screen printed from the first screen printing machine to the second screen printing machine and wherein the object remains in registration with the printing screens on the first and second screen printing machines.
Figure 3:
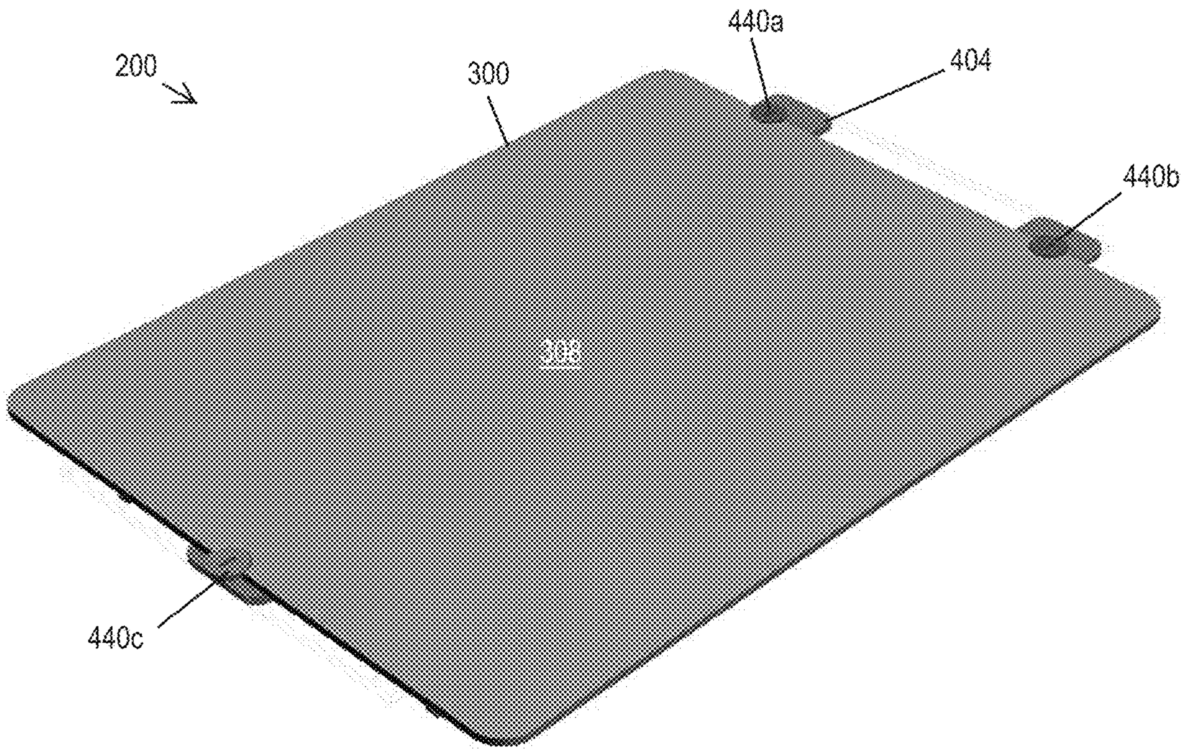
FIG. 3 is a perspective view of a pallet assembly for use in carrying out the method of the present invention.
Figure 4:
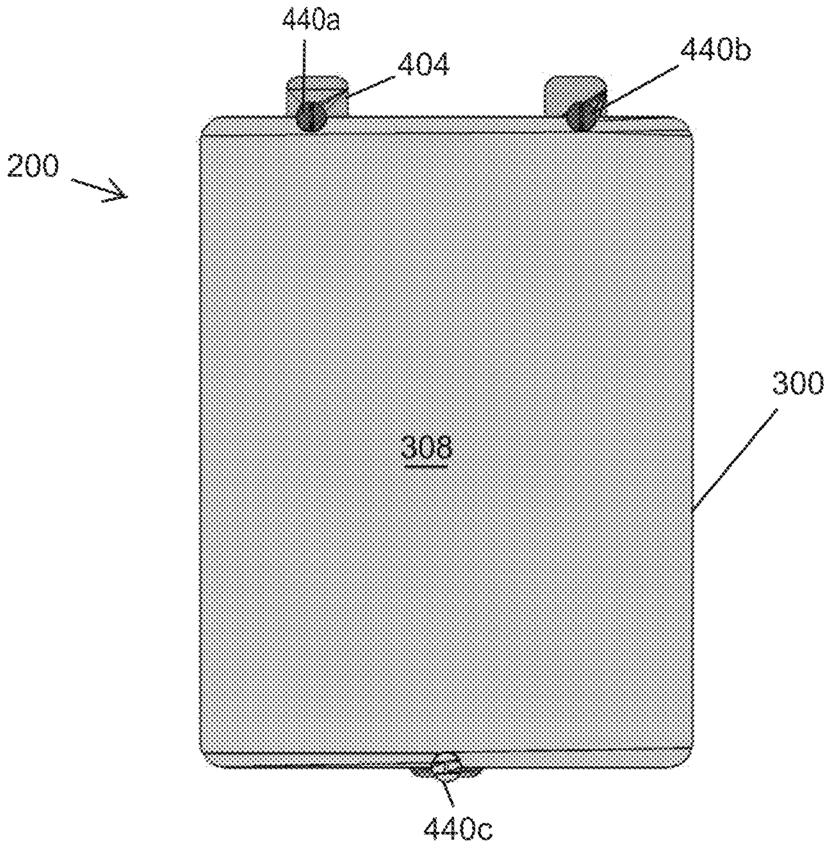
FIG. 4 is a is a top view of the pallet assembly.
Figure 5:
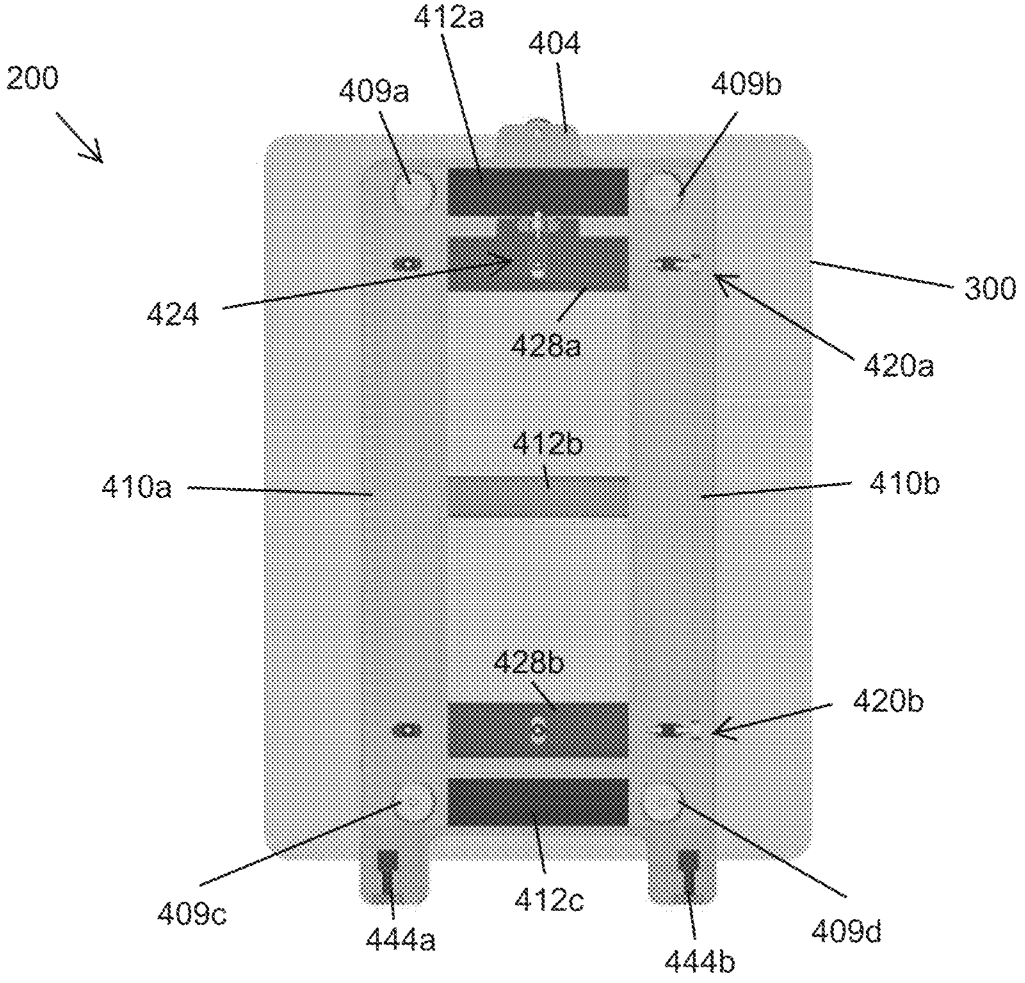
FIG. 5 is a bottom view of the pallet assembly.
Figure 6:
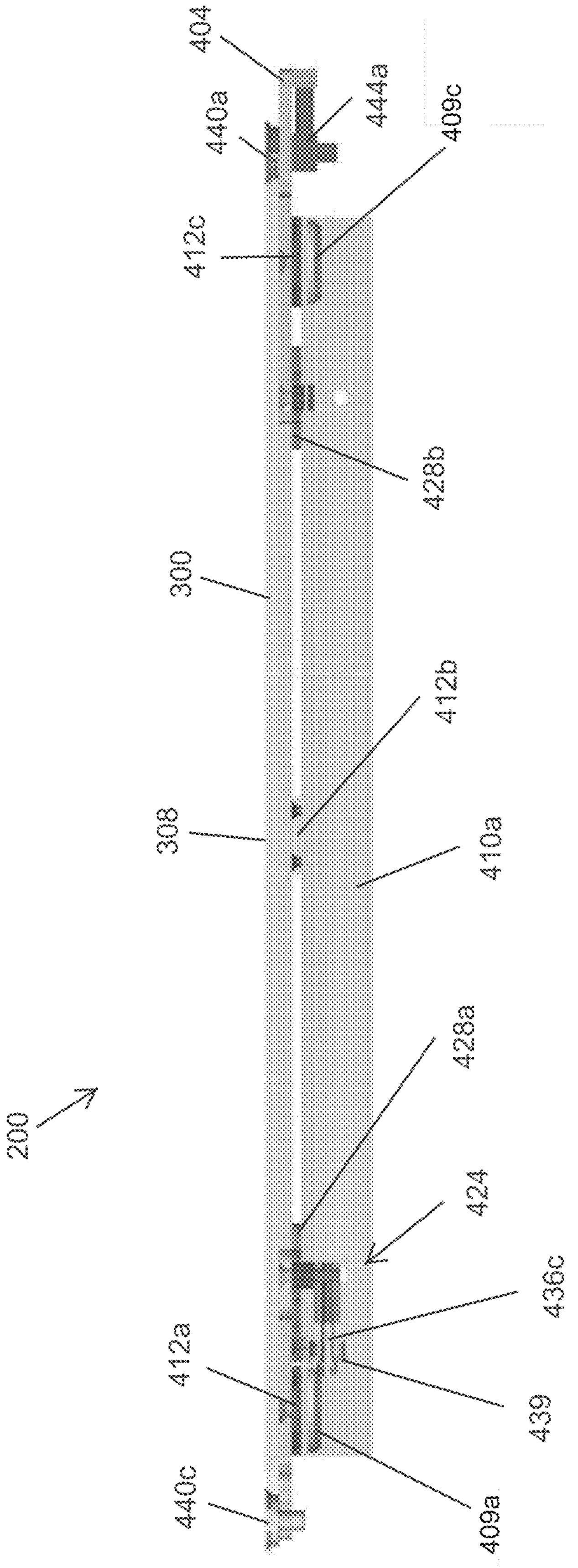
FIG. 6 is a is a cross-sectional of the pallet assembly taken through the center of the pallet assembly from the front edge to the back edge.
Figure 7:
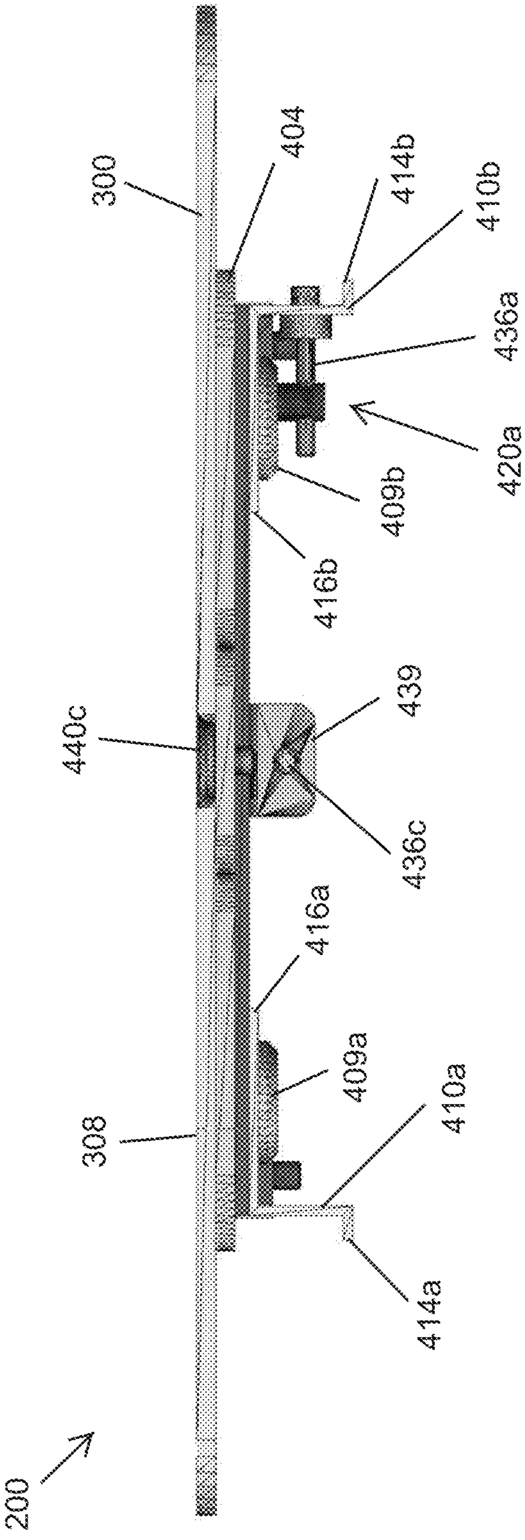
FIG. 7 is a front view of the pallet assembly.
Figure 8:
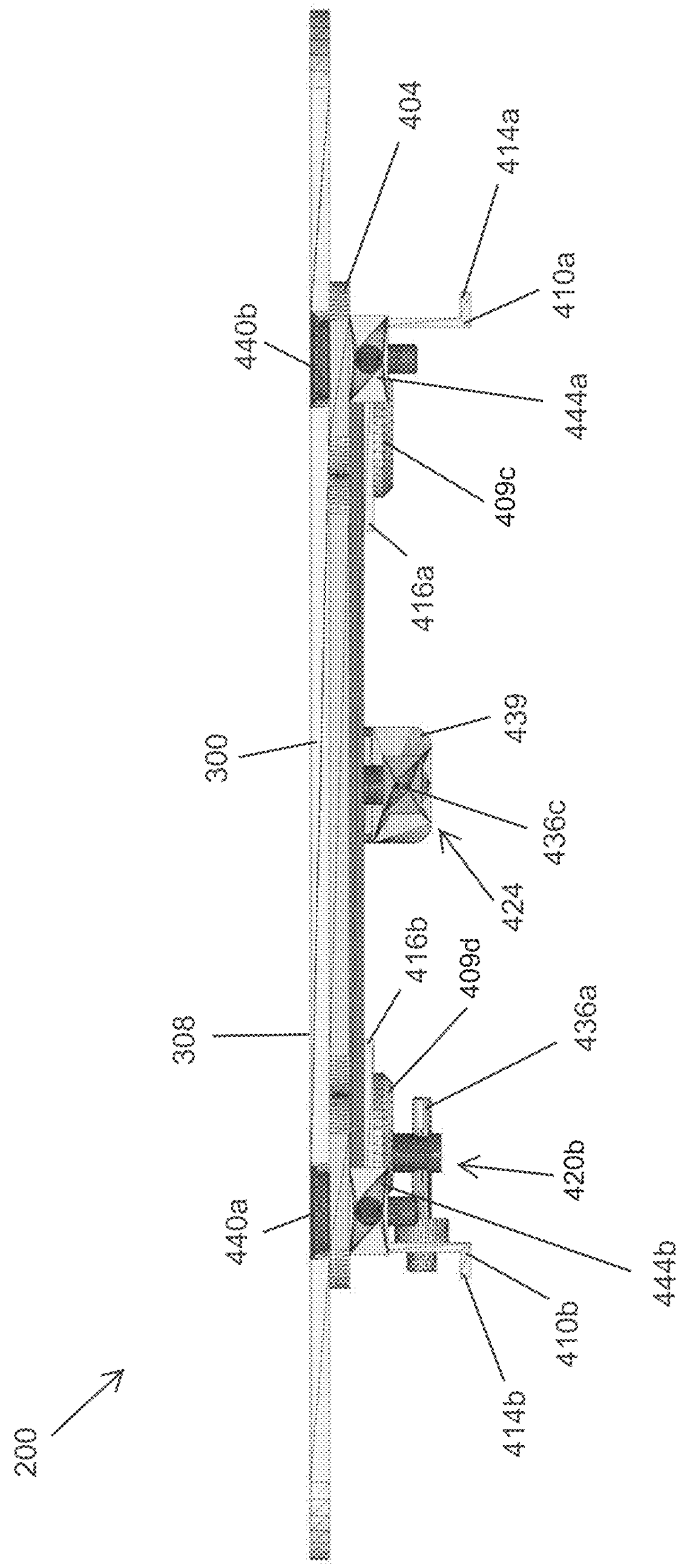
FIG. 8 is a back view of the pallet assembly.
Figure 9:
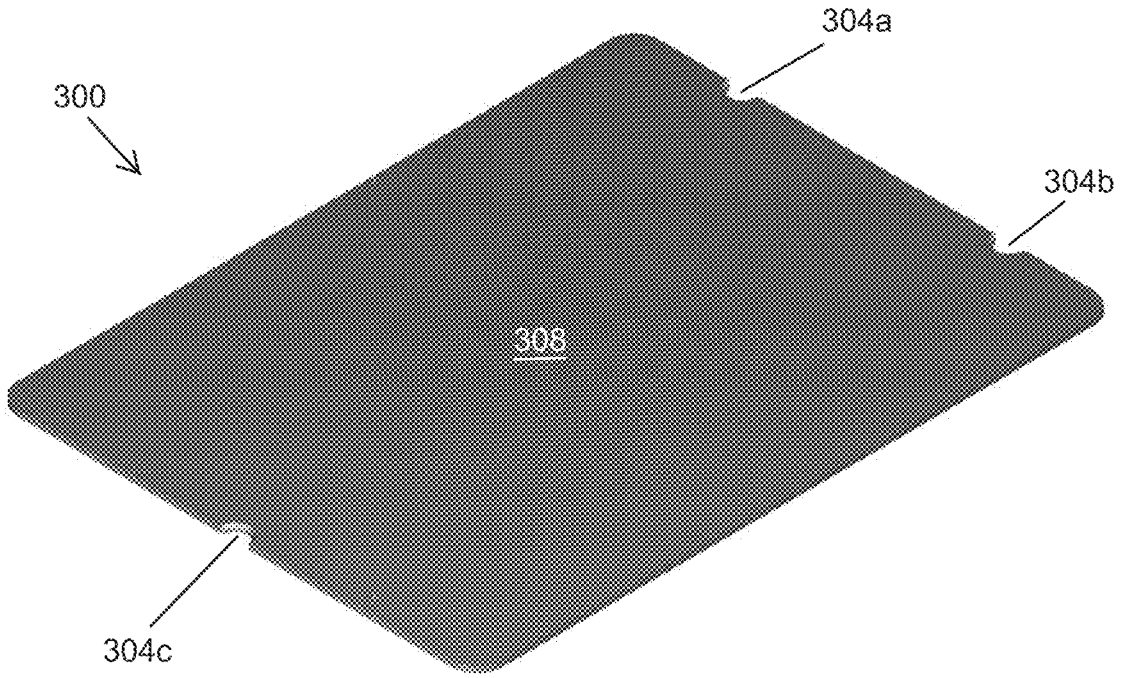
FIG. 9 is a perspective view of a removable pallet.
Figure 10:
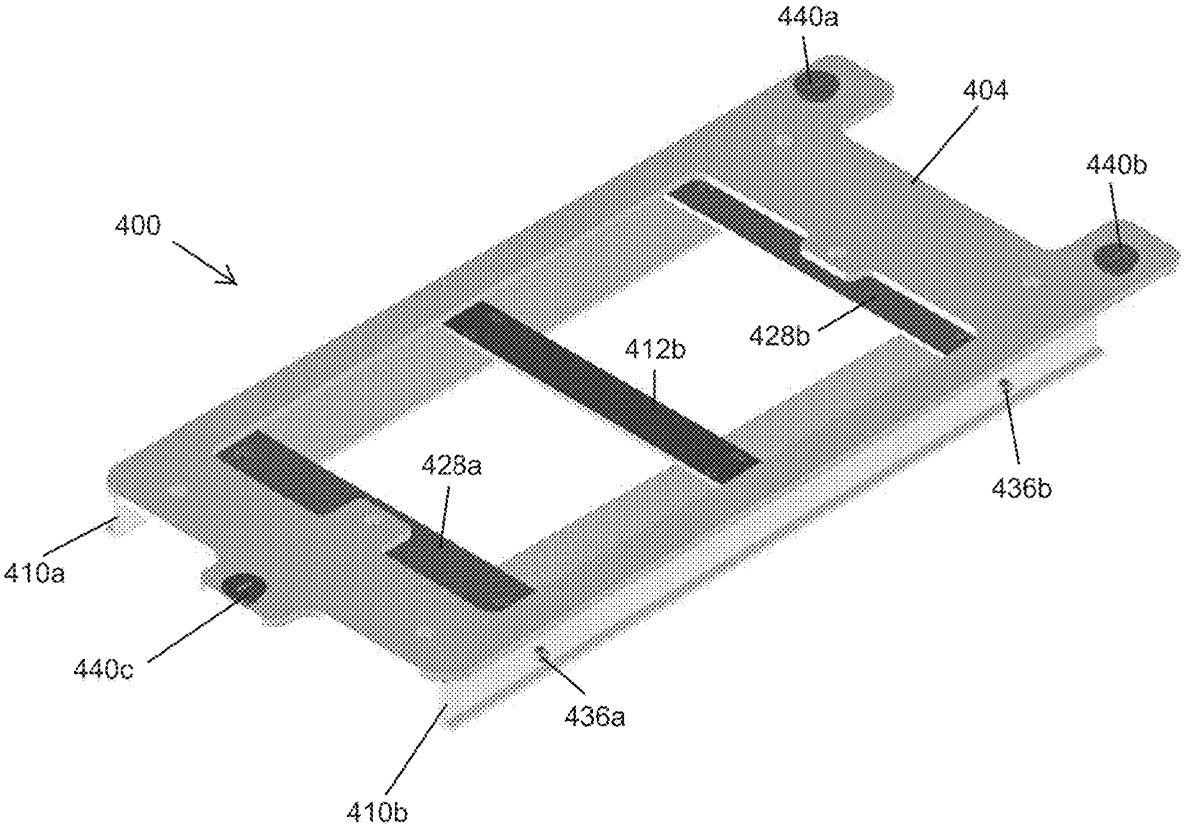
FIG. 10 is a perspective view of the pallet assembly with the pallet removed.
Figure 11:
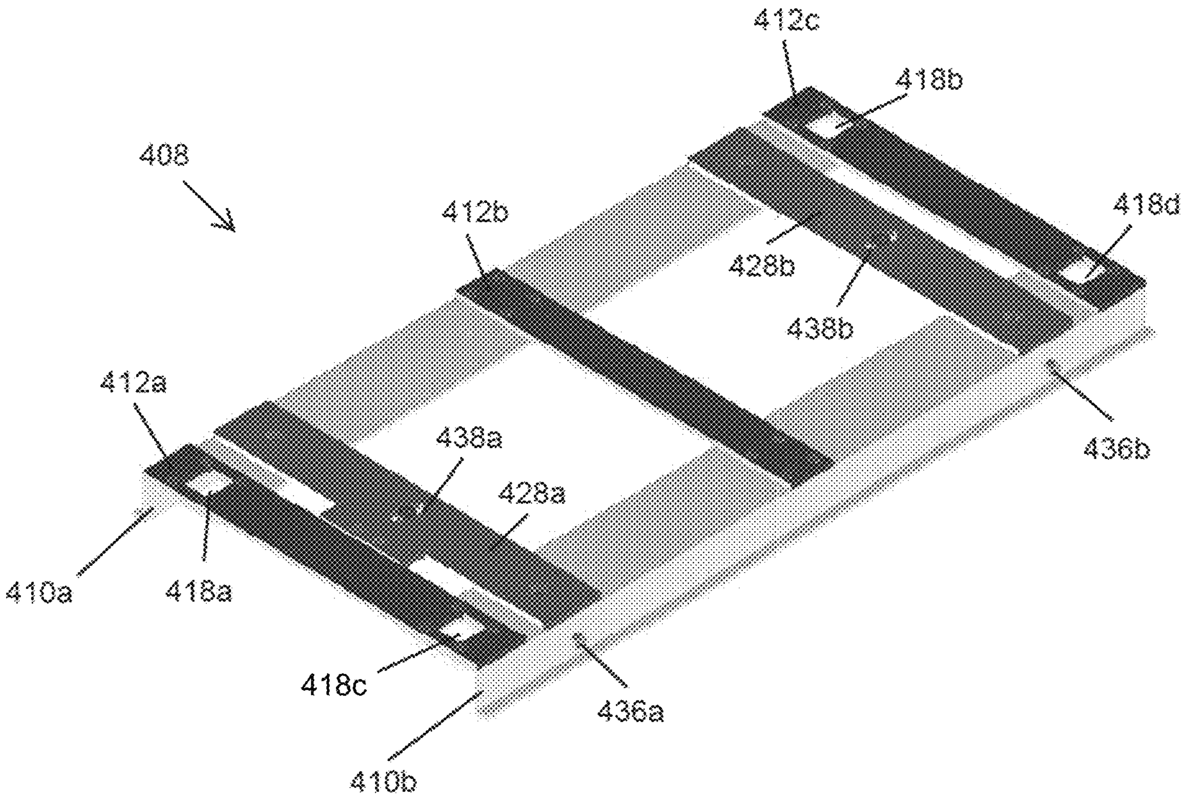
FIG. 11 is a perspective view of the pallet assembly with the upper subassembly removed.
Figure 12:
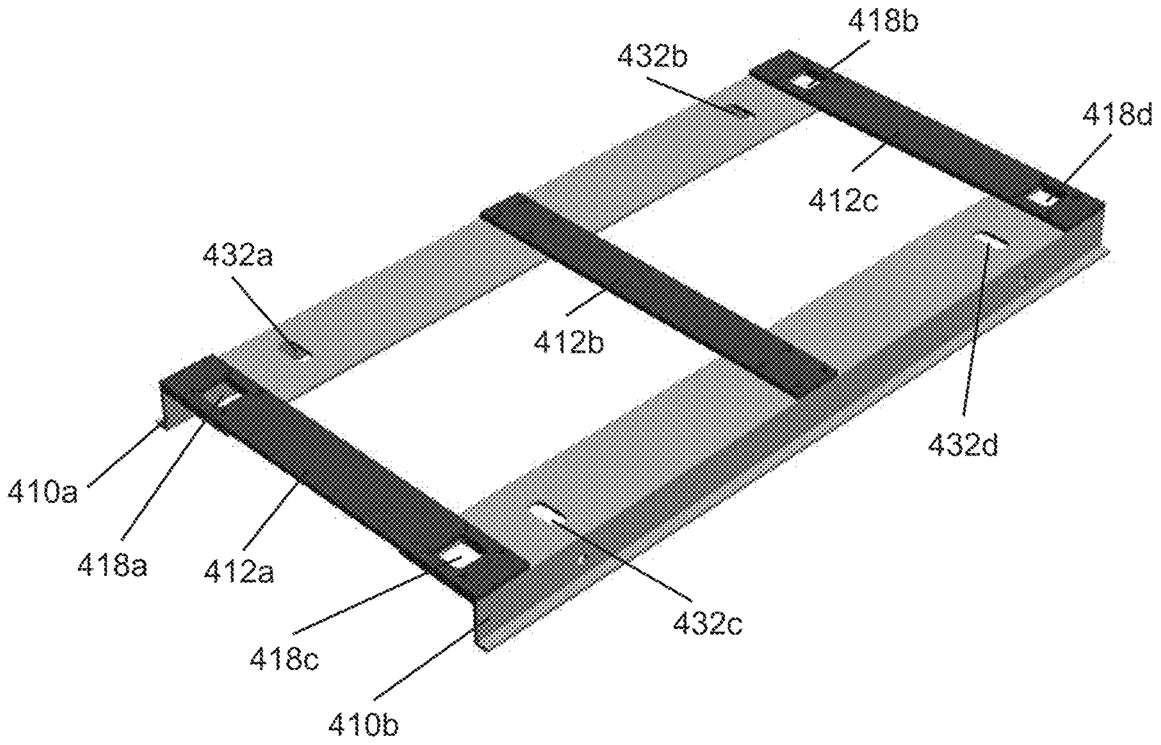
FIG. 12 is a perspective view of the lower pallet assembly with the X and Y coordinate adjuster removed.

As shown in FIG. 2, the present invention allows a user to transfer a pallet from a first screen printing machine 10 to a second screen printing machine 100. A novel and unobvious pallet assembly 200 attachable to the arms 70,170 first and second screen printing machines allows a printed upon garment to be transferred from the first machine to the second machine while remaining and/or achieving registration with the print heads 31 on the two machines.

It follows that a method of the present invention includes positional synchronizing a plurality of pallet assemblies 200 on a first screen printing machine 10 with a plurality of pallet assemblies 200 on a second screen printing machine 100. A screen printed garment having a properly aligned first image received from the first screen printing machine 10 can be transferred on a portion of one of the pallet assemblies 200, namely a removable pallet 300 on the first screen printing machine 10 to one of the plurality of pallet assemblies 200 on the second printing machine 100. The properly aligned first image on the garment is in proper positional alignment with a screen printing head on the second screen printing machine 100 such that a second image complimentary to the first image may be printed on the garment in proper position on the garment relative to the first image without user intervention to positionally locate the first image relative to the screen printing head on the second screen printing machine.

Here, the method is achieved through the use of a novel and inventive pallet assembly 200 illustrated in FIGS. 3-12. The pallet assembly 200 includes a removable pallet 300 supported on a subassembly 400. The pallet assembly 200 has a means for registering the removable pallet 300 with the subassembly 400 such that a removable pallet 300 can be transferred from one subassembly 400 to a like second subassembly 400 without losing proper registration of the pallet 200 with either subassembly. Stated another way, registration of the removable pallet 300 is synchronized such that it is simultaneously properly registered with the first subassembly and the like second subassembly and may be selectively placed on either subassembly without losing proper registration.

In one embodiment, the pallet 300 has a plurality of notches 304,*a,b,c* formed in a peripheral edge of the pallet 300. In the embodiment illustrated, two notches 304*a,b* are located on an opposite, or opposing edge, of the pallet 300 as a third notch 304*c*. It should be understood the placement of the notches 304*a,b,c* is at least somewhat optional in that they can be placed in various locations about the peripheral edge of the pallet 300 as long as three point registration is accomplished with the placement. The pallet 300 has a generally planar garment supporting surface 308 on an upper surface thereof.

The subassembly 400 attaches to the pallet arm 70 of the printing machine 10 and has mechanical controls to move and position the pallet 300 relative to the arm 70.

In one embodiment, the subassembly 400 comprises three primary parts—a pallet supporting frame, pallet support, or upper subassembly 404 for supporting the removable pallet 300, a separate arm connecting frame or lower subassembly 408 for connecting the subassembly 400 to the pallet arm 70, and an adjustment mechanism for moving the pallet supporting frame 404 relative to the arm connecting frame 408.

The upper subassembly 404 is supported by the lower subassembly 408. The upper subassembly 404 is fixedly attached to the lower assembly 408 during use. During set up, the upper subassembly 404 position relative to the lower subassembly 408 or on the lower subassembly 408 is variable such that proper registration of the entire pallet assembly 200 can be achieved as will explained below in more detail. Once the desired position of the upper subassembly 404 to the lower subassembly 408 is achieved, fasteners, such as threaded bolts and nuts or "hockey pucks" 409*a,b,c,d*, are tightened to fix the position of the upper subassembly 404 relative to the lower subassembly 408.

The lower subassembly 408 includes a pair of parallel rails 410*a,b* joined by beam members 412*a,b,c* fixedly attached to the rails 410*a,b* and spanning a space therebetween. The rails 410*a,b* include outwardly directed flanges 414*a,b* for attaching the pallet assembly 200 to the arm or the screen printing machine 10 and upper flanges 416,*a,b* for supporting the upper subassembly 404 thereon. The upper flanges 416*a,b* include large openings 418*a,b,c,d* which are aligned with the fasteners described above to allow, for example, a bolt to pass through the flanges 416*a,b* and have a large enough opening area to allow the bolt to move freely therein. The beam members 412*a,c* include complimentary large openings as illustrated. In other words, a bolt extending downwardly from the upper subassembly 404 is selectively moveable within the openings 418,*a,b,c,d* are tightened until, at least, the nuts 409*a,b,c,d*. This allows a given amount of relative movement between the upper subassembly 404 and the lower subassembly 408 until the fasteners are tightened. This is method of making macro-adjusting movements or large adjusting movements of the upper subassembly 404 relative to the lower subassembly 408.

Small movements of the position of the upper subassembly 404 relative to the lower subassembly 408 are controlled by the adjustment mechanism. In one embodiment, the adjustment mechanism includes a pair of X-coordinate adjusters 420*a,b* and a Y-coordinate adjuster 424 attached to cross members 428*a,b* which are slidable relative to the lower subassembly 408 in the X-direction, i.e. movement actuated by the X-coordinate adjusters, within slots 432*a,b,c,d* in the upper flanges 416*a,b* and restrained from movement transverse to that direction relative to the lower subassembly 408 by a shape of the slots 432*a,b,c,d*. The cross members 428*a,b*, like the beam members 412*a,b,c*, span the distance between the rails 410*a,b*.

Portions of the X-coordinate adjusters 420*a,b* pass through corresponding slots 432*b,d* in the flanges 416*a,b* and engage one of the rails 410*b*, for example, in threaded relationship therewith. Threaded actuators 436*a,b* can be turned to provide relative movement to the cross members 428*a,b* to micro-adjust or make small adjustments of the upper subassembly 404 relative to the lower subassembly 408.

The Y-coordinate adjuster passes through a slot 438*a* in one of the cross members 428*a* and engages an abutment 439 on a bottom surface of the cross member 428*a*, for example in threaded relationship therewith. A threaded actuator 436*c* can be turned to provide relative micro adjustment or small relative movement between the upper subassembly 404 and the lower subassembly 408. The Y-coordinate adjuster 424 is attached to the upper subassembly 404 via a fastener, for example a bolt, transfer movement thereto.

The upper subassembly 404 is joined to the lower subassembly 408 by the fastener described above relative to the Y-coordinate adjuster 424 and via a pin attached to the upper subassembly 404 and extending downwardly through a slot 438*b* in the cross member 428*b* opposite the cross member associated with the Y coordinate adjuster 424.

It should be understood that the slots 438*a,b* formed in the cross members 428*a,b* respectively generally extend in a lengthwise direction that is transverse to the slots 432*a,b,c,d* formed in the flanges 416*a,b* of the rails 410*a,b*.

The upper subassembly 404 further includes a plurality of pins 440*a,b,c* corresponding generally to the number of notches 304*a,b,c* in the pallet 300 and sized and located such that the pins 440*a,b,c* can be received within the notches 304*a,b,c* to register the pallet 300 with the subassembly 400. The pins 440*a,b,c* may include adjusters 444*a,b* to vary the location of the pins 440*a,b* somewhat relative to the surface of the upper subassembly 404. This will vary the position of the pallet 300 on the subassembly 400 and the size of the pallet 300 if so desired.

A method of using the pallet assembly in accordance with the principles of the invention follows.

A master registration screen 80 is used to register all of the subassemblies and pallets to two or more printing machines 10,100 (digital and screen).

The pallet 300 supports a textile to be printed upon and attaches to the subassembly 400 via a three point system (shown as three pins 440*a,b,c* on the subassembly 400 and three corresponding notches 304*a,b,c* on the pallet 300).

The subassembly 400 attaches to a pallet arm 70 of the printing machine 10 and has mechanical controls to move and position the pallet 300 relative to the arm 70.

There is a separate subassembly 400 releasably attached to each arm 70 of a printing machine 10.

Each pallet assembly 200 includes a pallet 300 releasably connected to the subassembly 400.

The pallet 300 is removable from the subassembly 400 and the subassembly 400 is releasably fixed or attached to the end of each arm 70.

A registration screen frame 80 is secured at a print head 31 (for example, Station No. 1) of a first printing machine 10.

The registration screen frame 80 has marking 84 thereon used for visually or physically indexing and aligning each pallet assembly 200 (the pallet and the subassembly).

For example, the registration frame 80 may have marks inside the frame, such as on a screen, or on the frame to align with complimentary marks 312 on a pallet 300. Alternatively, the frame may have projections or indentations that correspond with indentations and projections on the pallet to mechanically or visibly align the pallet to the registration frame.

Alignment is done by bringing the printing arm 70 with the pallet assembly 200 (the pallet 300 and subassembly 400) up to the registration frame 80 so there is a physical "kissing" of the two.

The upper subassembly 404 supporting the pallet 300 is then adjusted relative to the arm 70 connecting frame and consequently the lower subassembly 408 using the macro and micro means for adjustment described above.

Once alignment is completed, the pallet 300 is then removed and put onto the subassembly 400 of a second arm 70 and the second subassembly is rotated or indexed to its location under the registration frame 80 of the Station No. 1 and similarly registered or aligned.

The printing arms are rotated one at a time and aligned to the registration frame 80 at the single print head (Station No. 1). Only one pallet 300 needs to be used to align all of the subassemblies 400. The pallet 300 can moved from one subassembly 400 to the next like subassembly 400 as each like subassembly 400 is aligned.

Note that this single pallet 300 can have markings 312 thereon or even a textile thereon (such as one previously used in another printing machine, e.g., digital printing machine), to facilitate its alignment with the registration frame.

This alignment of all of the pallet assemblies 200 (the single pallet and the many subassemblies) is performed for each arm 70. As a result, if there are 12 arms for printing, there will be 12 subassemblies aligned, one for each arm. Again, the same pallet can be used to align each subassembly.

The registration screen frame 80 is removed from the print head 31 and installed onto the second printing machine 100 for use thereon.

The second printing machine 100 can then be set-up in the same manner as the first printing machine, such as using Station No. 1 print head to support the registration screen frame and using the same pallet to register all of the subassemblies on all of the print arms.

Once the pallet assembly 200 is aligned, the printing screens at the printing heads are next aligned.

It should be noted that the above procedure can be used to link two screen printing machines 10,100 together so as to maintain registration or alignment between the machines. For example, if a shop has a two 12 color screen printing machines 10,100 and wants to print a sixteen color job (16 printing heads), it can link the two machines so that the combination of printing heads used at the two machines for the job is sixteen, such as seven print heads on machine one and nine print heads on the second machine 100, or eight print heads on the first machine 10 and eight print heads on the second machine 100, nine print heads on the first machine 10 and seven print heads on the second machine 100, etc.

In addition, the linking can be used with one or more digital textile printing machines (Direct-to-Garment Printers ("DTG")). Using the pallet above, the DTG printer is the first machine and prints on a textile and the pallet described above is used to align/register a second printer, such as a screen printing machine. The registration screen frame is secured at a print head (for example, Station No. 1) of a second printing machine. Thus, any number of combinations of DTG printers and screen printer machines can be linked together.

Examples of DTG printers are those manufactured by M&R Printing Equipment, Inc., Glen Ellyn, Illinois under the i-Dot® trademark (U.S. Pat. No. 3,643,519), such as the i-Dot 4100, i-Dot 2100, and the i-Dot.

Registering the Printing Screens on a First Printing Machine

To register the screens on a machine, one textile pallet is removed from the subassembly affixed to a printing arm and then replaced with a Tri-Loc® registration pallet. The Tri-Loc® system is a registered trademark of M&R Printing Equipment, Inc., Glen Ellyn, Illinois (U.S. Pat. No. 2,221,197) and patented under U.S. Pat. Nos. 5,953,987, 5,943,953, and 5,921,176, the disclosures therein incorporated herein by reference.

The screens with images thereon in their respective printing frames are placed in the print heads.

Tri-Loc® registration pallet is then used to register each screen.

Specifically, the pallet arm with the pallet assembly having the Tri-Loc® registration pallet thereon is rotated to each print station and print head, aligned, and the screen and frame secured.

When complete, the Tri-Loc® registration pallet is removed from the pallet subassembly of the pallet assembly and replaced with a regular pallet carrying a textile.

Registering the Pallet Assemblies on a Second Printing Machine

The original registration screen frame is installed on the print head.

The process above is repeated with the second printing machine.

Registering the Printing Screens on a First Printing Machine

The original Tri-Loc® registration pallet is installed onto a new pallet subassembly of the pallet assembly on the second printing machine and the process above is repeated with the second machine.

In one embodiment, a method of screen printing comprising the step of positionally synchronizing a plurality of pallet assemblies 200 on a first screen printing machine 10 with a plurality of pallet assemblies 200 on a second screen printing machine 100 wherein a screen printed garment having a properly aligned first image received from the first screen printing machine can be transferred on a portion of one of the pallet assemblies 200 on the first screen printing machine 10 to one of the plurality of pallet assemblies 200 on the second printing machine 100 and wherein the properly aligned first image on the garment is in proper positional alignment with a screen printing head 31 on the second screen printing machine 100 such that a second image complimentary to the first image may be printed on the garment in proper position on the garment relative to the first image without further user intervention to positionally locate the first image relative to the screen printing head 31 on the second machine 100.

This embodiment may include one or more of the following steps, alone or in any reasonable combination. The method may further include the step of positionally synchronizing a plurality of print heads on the first screen printing machine with one of the plurality of pallet assemblies on the first screen printing machine. The method may further comprise the step of positionally synchronizing a plurality of print heads on the second screen printing machine with one of the plurality of pallet assemblies on the second screen printing machine.

In one embodiment a method of screen printing comprising the steps of: (1) establishing a first screen printing machine 10 having a frame, a plurality of printing heads 31 attached to the frame and a plurality of pallet assemblies 200 attached to the frame and separately and alternatingly alignable with each of the plurality of printing heads 31 wherein each of the pallet assemblies 200 comprises a subassembly 400 attached to the frame and locationally adjustable relative thereto; (2) establishing a second screen printing machine 100 also having a frame, a plurality of printing heads 31 attached to the frame and a plurality of pallet assemblies 200 attached to the frame and separately and alternatingly alignable with each of the plurality of printing heads 31 wherein each of the pallet assemblies 200 comprises a subassembly 400 attached to the frame and locationally adjustable relative thereto; (3) establishing a first alignment means 84 supported by the first screen printing machine 10; (4) providing a pallet 300 removably transferable between the subassemblies 400 and positionally registered relative thereto; (5) adjusting a position of the pallet 300 as it is transferred to each pallet assembly 200 on the first screen printing machine 10 relative to the first alignment means 84; (6) transferring the first alignment means 84 to the second screen printing machine 100 and supporting the first alignment means 84 by the second screen printing machine 100; (7) adjusting a position of the pallet 300 as it is transferred to each pallet assembly 200 on the first screen printing machine 10 relative to the first alignment means 84; (8) registering a position of each of the printing heads 31 on the first screen printing machine 10 relative to a first pallet assembly 200 on the first screen printing machine 10; and (9) registering a position of each of the printing heads 31 on the second screen printing machine 100 relative to a second pallet assembly 200 on the second screen printing machine 100.

In one embodiment, a pallet assembly 200 comprises a removable pallet 300 and a subassembly 400 attachable to an arm 70 of a screen printing apparatus 10. The subassembly 400 comprises an upper subassembly 404 and a lower subassembly 408. The upper subassembly 404 has a first registration system 440*a,b,c* for maintaining the pallet 300 on the upper subassembly 404 in proper registration. The lower subassembly 408 is attached to the upper subassembly 404 and is configured for relative movement therewith. The lower subassembly 408 has a second registration system. The second registration system provides relative X and Y coordinate movement between the upper subassembly 404 and the lower subassembly 408. A pair of first-coordinate adjusters 420*a,b* allow actuation of a first relative movement between the upper subassembly 404 and the lower subassembly 408. A second-coordinate adjuster 424 actuation of a second relative movement between the lower subassembly 408 and the upper subassembly 404 transverse to the first relative movement.

This embodiment may include one or more of the following features, alone or in any reasonable combination. The first registration system may comprise a pair of spaced adjustable pins 440*a,b* and a fixed pin 440*c* wherein the pair of adjustable pins 440*a,b* are located along an opposite edge of the upper subassembly 400 as the fixed pin 440*c* and wherein the adjustable pins 440*a,b* and the fixed pin 440*c* project outwardly from the upper subassembly 404. The first-coordinate adjusters 420*a,b* comprise a threaded actuator 436*a,b* for dynamic adjustment of a position of the upper subassembly 404 relative to the lower subassembly 408. The second coordinate adjuster 424 may comprise a threaded actuator 436*c* for dynamic adjustment of a position of the upper subassembly 404 relative to the lower subassembly 408.

In one embodiment, a method of screen printing comprising the steps of: (1) establishing a first screen printing machine 10 having a frame, a plurality of printing heads 31 attached to the frame and a plurality of pallet assemblies 200 attached to the frame and separately and alternatingly alignable with each of the plurality of printing heads 31 wherein each of the pallet assemblies 200 comprises a subassembly 400 attached to the frame and locationally adjustable relative thereto; (2) establishing a second screen printing machine 100 also having a frame, a plurality of printing heads 31 attached to the frame and a plurality of pallet assemblies 200 attached to the frame and separately and alternatingly alignable with each of the plurality of printing heads 31 wherein each of the pallet assemblies 200 comprises a subassembly 400 attached to the frame and locationally adjustable relative thereto; (3) establishing a first alignment means 84 supported by the first screen printing machine 31; (4) providing a pallet 300 removably transferable between the subassemblies 400 and positionally registered relative thereto; (5) adjusting a position of the pallet 300 as it is transferred to each pallet assembly 200 on the first screen printing machine relative to the first alignment means 84; (6) transferring the first alignment means 84 to the second screen printing machine 100 and supporting the first alignment means by the second screen printing machine 100; and (7) adjusting a position of the pallet 300 as it is transferred to each pallet assembly 200 on the first screen printing machine 10 relative to the first alignment means 84.

This embodiment may include one or more of the following features, alone or in any reasonable combination. The method may further include the step of registering a position of each of the printing heads 31 on the first screen printing machine 10 relative to a first pallet assembly 200 on the first screen printing machine 10. The method may further include the step of registering a position of each of the printing heads 31 on the second screen printing machine 100 relative to a second pallet assembly 200 on the second screen printing machine 100.

In one embodiment, a method of screen printing comprising the steps of: 1) attaching a first plurality of like pallet assemblies 200 to a corresponding number of support arms 70 on a first screen printing apparatus 10 wherein each pallet assembly 200 comprises a lower subassembly 408 attached to one of the support arms 70 and an upper subassembly 404 for supporting a pallet thereon having a pallet registry system; 2) attaching a second plurality of like pallet assemblies 200 to a corresponding number of support arms 170 on a second screen printing apparatus 100 wherein each of the second plurality of like pallet assemblies 200 is substantially identical to the first plurality of like pallet assemblies 200; 3) establishing a first alignment mechanism between the first screen printing apparatus 10 and the first plurality of like pallet assemblies 200 wherein the alignment mechanism comprises a removable pallet 300 having a first target 312 thereon which separately engages the pallet registry system when supported by a corresponding upper subassembly 404 and a second target 84 attached to a first print station on the first screen printing apparatus 10; 4) supporting the removable pallet 300 on a first pallet assembly 200 of the first plurality of like subassemblies 200; 4) bringing the first pallet assembly 200 of the first plurality of like subassemblies 200 to the first print station on the first screen printing machine 10; 6) aligning the first target 84 with the second target 312 by providing relative movement between the upper subassembly 404 and the lower subassembly 408 of the first pallet assembly 200 of the first plurality of like subassemblies; 7) fixing the relative position of the upper subassembly 404 to the lower subassembly 408 of the first pallet assembly 200 of the first plurality of like subassemblies 200; 8) repeating steps 4) through 7) for each remaining pallet assembly in the first plurality of like pallet assemblies; 9) establishing the alignment mechanism on the second screen printing apparatus; 10) performing steps 4) through 7) for each pallet assembly 200 in the second plurality of like pallet assemblies 200.

This embodiment may include one or more of the following features, alone or in any reasonable combination. The method may further comprises the step of registering each print head 31 in a first plurality of print heads on the first screen printing apparatus 10 to one of the subassemblies 200 in the first plurality of like pallet assemblies 200. The method may further comprise the step of registering each print head 31 in a second plurality of print heads on the second screen printing apparatus 100 to one of the subassemblies 200 in the second plurality of like pallet assemblies 200.

In one embodiment a pallet assembly 200 comprises a removable pallet 300 and a subassembly 400. The subassembly 400 is attachable to an arm 70 of a screen printing apparatus 10. The subassembly 400 comprises an upper subassembly 404 and a lower subassembly 408. The upper subassembly 404 has a first registration system for maintaining the pallet 300 on the upper subassembly 404 in proper registration. The lower subassembly 408 is attached to the upper subassembly 404 and is configured for relative movement therewith. A second registration system provides relative X and Y coordinate macro movement between the upper subassembly 404 and the lower subassembly 408. A third registration system separate from the second registration system provides relative X and Y coordinate micro movement between the upper subassembly 404 and the lower subassembly 408.

This embodiment may include one or more of the following features, alone or in any reasonable combination. The third registration system may comprise a pair of first-coordinate adjusters 420*a,b* allowing actuation of a first relative movement between the upper subassembly 404 and the lower subassembly 408. The second registration system may comprise a second-coordinate adjuster 424 allowing actuation of a second relative movement between the lower subassembly 408 and the upper subassembly 404 transverse to the first relative movement. The second registration system may comprise an aperture 418*a,b,c,d* in one of the upper subassembly 404 or the lower subassembly 408 having an opening area, and a fastener attaching the upper subassembly 404 to the lower subassembly 408 having a portion which passes through the aperture 418*a,b,c,d* which has a cross-sectional area smaller than the opening area of the aperture 418*a,b,c,d* to allow movement therein and a complimentary portion for fixing a relative position between the upper subassembly 404 and the lower subassembly 408.

The terms "first," "second," "upper," "lower," "top," "bottom," etc. are used for illustrative purposes relative to other elements only and are not intended to limit the embodiments in any way. The term "plurality" as used herein is intended to indicate any number greater than one, either disjunctively or conjunctively as necessary, up to an infinite number. The terms "joined," "attached," and "connected" as used herein are intended to put or bring two elements together so as to form a unit, and any number of elements, devices, fasteners, etc. may be provided between the joined or connected elements unless otherwise specified by the use of the term "directly" and/or supported by the drawings.

While the specific embodiments have been illustrated and described, numerous modifications come to mind without significantly departing from the spirit of the invention, and the scope of protection is only limited by the scope of the accompanying Claims.

What is claimed is:

1. A removable pallet system for maintaining proper registration on a first printing machine and on a second printing machine comprising:

a removable pallet having a planar garment supporting upper surface defining an X direction and a perpendicular Y direction;

an upper assembly for supporting the removable pallet;

a lower assembly for connecting the upper assembly, lower assembly and pallet to an arm of one of the first printing machine and the second printing machine; and, an adjustment mechanism including a first X-coordinate adjuster including a first horizontal threaded actuator and a first Y-coordinate adjuster including a second horizontal threaded actuator for moving the upper assembly relative to the lower assembly.

2. The removable pallet system of claim 1 further comprising a plurality of fasteners which can be tightened to fix a position of the upper assembly to the lower assembly.

3. The removable pallet system of claim 2 wherein the lower assembly includes a first rail and a second rail spaced from and parallel to the first rail.

4. The removable pallet system of claim 3 further comprising a plurality of spaced apart beam members fixedly attached to the first rail and the second rail.

5. The removable pallet system of claim 4 wherein the first rail includes a first lower outwardly directed flange and the second rail includes a second lower outwardly directed flange, the first lower outwardly directed flange and the second lower outwardly directed flange for connecting the removable pallet to one of the arm of the first printing machine and the second printing machine.

6. The removable pallet system of claim 5 wherein the first rail includes a first upper inwardly directed flange and the second rail includes a second upper inwardly directed flange, the first upper inwardly directed flange and the second upper inwardly directed flange for supporting the upper assembly on the lower assembly.

7. The removable pallet system of claim 6 wherein the first upper inwardly directed flange and the second upper inwardly directed flange include a plurality of openings where each of the plurality of openings is aligned with a respective one of the plurality of fasteners.

8. The removable pallet system of claim 7 wherein at least one of the plurality of spaced apart beam members includes a first opening aligned with one of the plurality of openings in the first upper inwardly directed flange, and a second opening aligned with one of the plurality of openings in the second upper inwardly directed flange.

9. The removable pallet system of claim 8 wherein the lower assembly includes a first cross member spanning from the first rail to the second rail.

10. The removable pallet system of claim 9 wherein the first X-coordinate adjuster and the first Y-coordinate adjuster are connected to the first cross member.

11. The removable pallet system of claim 1 wherein the removable pallet includes a first notch formed in a first peripheral edge of the removable pallet and a second notch formed in a second peripheral edge of the removable pallet opposite the first peripheral edge.

12. The removable pallet system of claim 11 wherein a first notch of the plurality of notches is formed on a first end of the removable pallet and a second notch of the plurality of notches is formed on the first end of the removable pallet spaced from the first notch.

13. The removable pallet system of claim 12 further comprising a third notch of the plurality of notches formed on a second end of the removable pallet opposing the first end.

14. The removable pallet system of claim 13 wherein the upper assembly includes a registration system for maintaining the removable pallet on the upper assembly in registration.

15. The removable pallet system of claim 14 wherein the registration system includes a plurality of pins, where each pin of the plurality of pins can be received in a corresponding one of the plurality of notches in the removable pallet to register the removable pallet with the upper assembly.

16. The removable pallet system of claim 15 wherein each pin of the plurality of pins includes an adjuster to vary the location of the pin relative to an upper surface of the upper assembly.

17. The removable pallet system of claim 1 wherein the adjustment mechanism includes a second X-coordinate adjuster.

18. A removable pallet system for maintaining proper registration on a first printing machine and on a second printing machine comprising:

a removable pallet having a planar garment supporting upper surface defining an X direction and a perpendicular Y direction;

an upper assembly for supporting the removable pallet;

a lower assembly for connecting the upper assembly, lower assembly and pallet to an arm of one of the first printing machine and the second printing machine, wherein the lower assembly includes a first rail and a second rail spaced from and parallel to the first rail;

an adjustment mechanism for moving the upper assembly relative to the lower assembly;

a plurality of fasteners which can be tightened to fix a position of the upper assembly to the lower assembly; and, a plurality of spaced apart beam members fixedly attached to the first rail and the second rail wherein the first rail includes a first lower outwardly directed flange and the second rail includes a second lower outwardly directed flange, the first lower outwardly directed flange and the second lower outwardly directed flange for connecting the removable pallet to one of the arm of the first printing machine and the second printing machine and wherein the first rail includes a first upper inwardly directed flange and the second rail includes a second upper inwardly directed flange, the first upper inwardly directed flange and the second upper inwardly directed flange for supporting the upper assembly on the lower assembly and wherein the first upper inwardly directed flange and the second upper inwardly directed flange include a plurality of openings where each of the plurality of openings is aligned with a respective one of the plurality of fasteners and wherein at least one of the plurality of spaced apart beam members includes a first opening aligned with one of the plurality of openings in the first upper inwardly directed flange, and a second opening aligned with one of the plurality of openings in the second upper inwardly directed flange.

* * * * *